Figure 1:
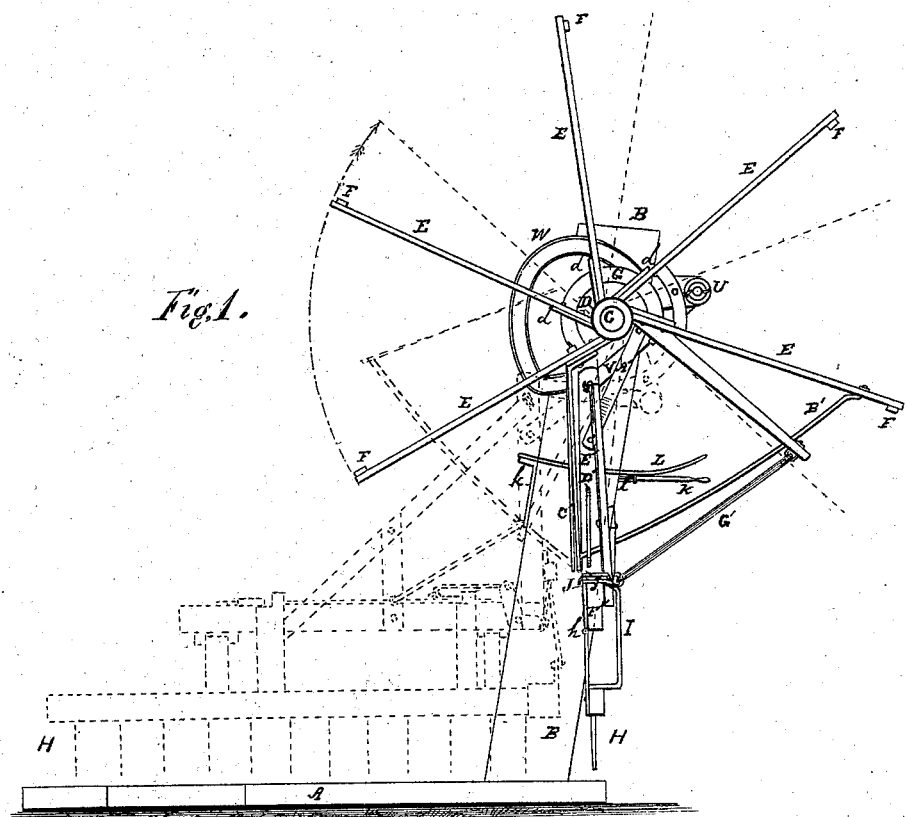

2 Sheets--Sheet 1.

C. A. WERDEN.
Reel-Rakes for Harvesters.

No. 136,885.  Patented March 18, 1873.

Witnesses  
Inventor  
Cyrus A. Werden  
By Gridley & Warner  
Attys

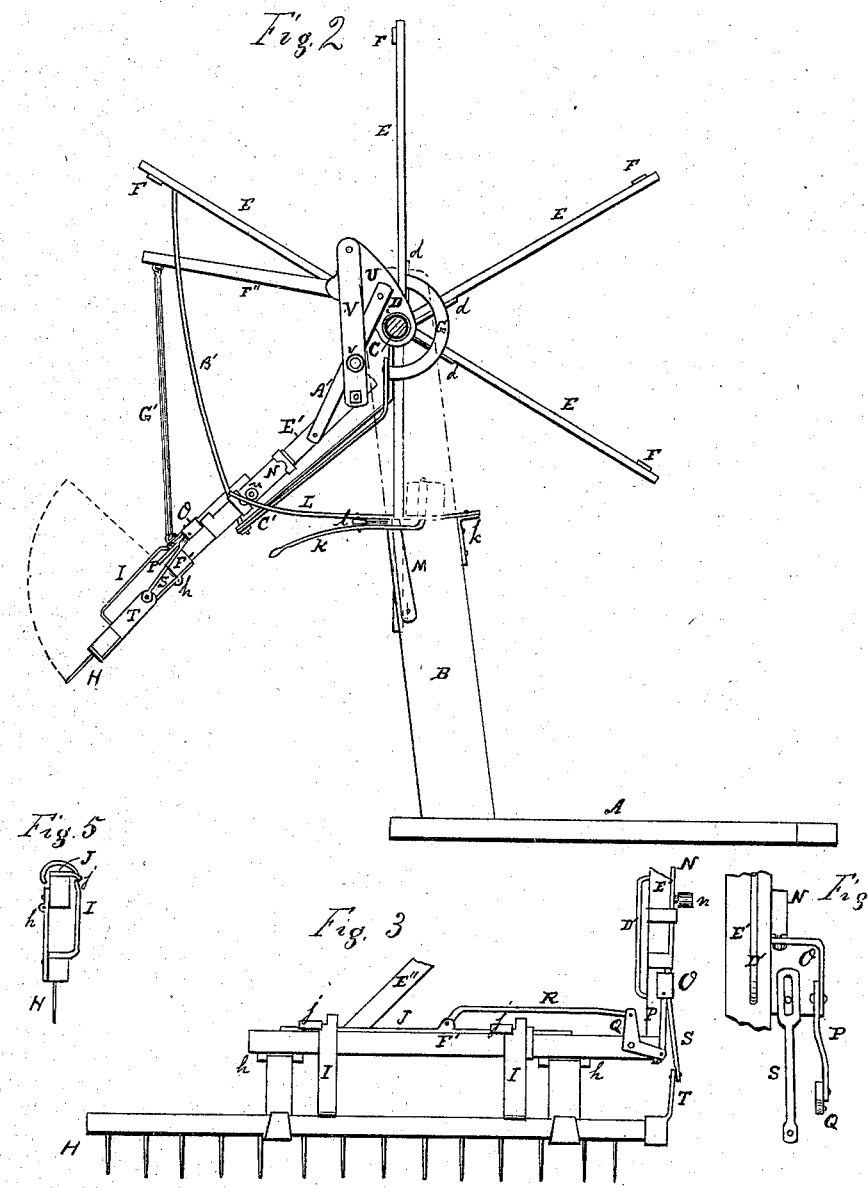

UNITED STATES PATENT OFFICE.

CYRUS A. WERDEN, OF WAUKEGAN, ILLINOIS.

IMPROVEMENT IN REEL-RAKES FOR HARVESTERS.

Specification forming part of Letters Patent No. 136,885, dated March 18, 1873.

*To all whom it may concern:*

Be it known that I, CYRUS A. WERDEN, of Waukegan, in the county of Lake and State of Illinois, have invented certain new and useful Improvements in Harvester Reel-Rakes, of which the following is a full, clear, and exact description, which will enable others skilled in the art to which my invention appertains to make and use the same, reference being had in so doing to the accompanying drawing forming a part of this specification, and in which—

Figure 1 represents a side elevation of one side of my improved rake; Fig. 2, a side elevation of the other side, certain parts being removed; Fig. 3, a front elevation of the rake and certain parts operating in connection with it; Fig. 4, an enlarged view of a part of the rake-folding mechanism; and Fig. 5, an end view of the rake-head and its supporting-bar.

Like letters of reference indicate like parts.

My invention relates to that class of harvester reel-rakes the operation of which is automatic, and which sweep the platform quadrantally, so as to deliver the cut grain in gavels at the side of the harvester; and it consists in certain novel features relating to the means employed for the purpose of moving the rake quadrantally and returning it to its position in the reel during the rotation of the latter; it also consists in rendering the rake inoperative during the rotation of the reel, and in the means employed for that purpose.

In the drawing, A represents the platform of the harvester. B is a standard which supports the reel. C is the reel-shaft which has its bearing in the standard B. D is a sleeve rigidly attached to the reel-shaft, and $d\ d$ are radial wings projecting from the sleeve D. E E are arms rigidly attached to the wings $d\ d$, and F F are beaters rigidly attached to the arms E E. G is a brace connecting the arms E E. H is the rake, and F' is a false beater to which it is attached by means of the hinges $h\ h$. I I are bent pieces rigidly attached to the rake-head. J is a slide on the beater F'. $j\ j$ are lugs projecting from the slide J. The pieces I I are cut and bent so as to rest under the lugs $j\ j$, and thus retain the rake-teeth in a vertical position, or nearly so, during the operation of the rake; they are also bent to hook over the beater F', so as to prevent the rake-teeth from falling into a vertical position before they reach the platform. By sliding the bar J in the proper direction the lugs $j\ j$ release the pieces I I, and the rake may then be swung upward upon its hinges so as to be inoperative, as shown by the dotted line in Fig. 2.

The following is the means employed for the purpose of operating the bar J, and folding the rake in the manner described: K is a lever pivoted to the standard B so as to be conveniently reached by the operator. $k$ is a bracket upon the standard B, and L is a guide or way to the bracket $k$. $l$ is a connecting-bar pivoted to the lever K and to the way L. M is a spring attached to the standard B, and pressing outwardly upon the lever K. An inward pressure upon the free end of the lever K throws the way L inward, and when this inward pressure ceases the spring M returns the lever to its original position. E' is a vertical arm extending from the beater F', and N is a slide on the arm E'. $n$ is, preferably, a friction-roller projecting laterally from the slide N. O is a link or block pivoted to the lower end of the bar N, so as to be capable of turning horizontally on its pivot. P is a rod pivoted to the block O. Q is a bell-crank pivoted to the beater F', and one end of the rod P is pivoted to one arm of the bell-crank. R is a rod pivoted to the other end of the bell-crank and the slide J. S is a rod, one end of which is slotted, and this slotted end is supported by a pin projecting from the block O into the slot. The lower end of the rod S is pivoted to the upper end of an arm, T, rigidly attached to one end of the rake-head. By this means, as the slide N is moved upward the lugs $j\ j$ upon the slide J release the pieces I I, and the rake may be folded in the direction indicated by the dotted lines in Fig. 2, the upward movement of the rake releasing the hooked ends of the pieces I I from the beater F'. The movement of the slide J begins with the upward movement of the slide N, and the rod S does not act on the arm T until the lugs $j\ j$ move away from the pieces I I, for the reason that the pin which plays in the slotted end of the arm or rod S does not reach the top of the slot until the contact of the lugs $j\ j$ with the pieces I I is broken. The arm T is carried upward to a height nearly equal to the joint of the hinges $h\ h$, and its upper end is somewhat forward of the hinge-joints, so as to prevent a "dead-center" lock and fold the rake by a slight upward movement of the rod S. The way L is constructed and arranged to receive the friction-roller $n$ when the lever K is operated, and draw the slide N upward as the reel revolves, and keep the rake folded until it has passed over the platform. During the continued movement of the reel the rake falls into its original position, reverses the action of the locking mechanism, and is locked so as to sweep the platform.

In order to produce the quadrantal sweep of the rake I attach the arm U rigidly to the sleeve D. V is a lever, one end of which is pivoted to the lower end of the arm U. $v$ is an arm projecting laterally from the lever V, and, preferably, provided with a friction-roller. W is a grooved cam, rigidly attached to the standard B, and arranged thereon so that the arm $v$ will ride in the groove of the cam as the reel is revolved. The upper end of the arm E' is pivoted to the other end of the lever V. A' is a connecting-rod or bar pivoted to the arm U at a point between the lever V and the sleeve D, and the opposite end of the bar A' is pivoted to the arm E' at a point below the lever V. E" is an inclined brace, suspending one end of the beater F', and is attached to the arm E' by a swivel-joint. The beater F' is pivoted to the lower end of the arm E', so as to swing horizontally on its pivot. B' is a bent rod, one end of which is attached to one of the beater-arms or braces, and the other end of which is attached to a brace, C'. D' is a slot or guide on the arm E', through which slot the rod B' passes freely. F'" is an arm extending from the reel, and G' is a pushing-rod attached to the said arm and to the beater F' by means of swivel-joints.

As the reel is revolved or rotated the upper end of the arm E' moves away from the reel-shaft, and the lower end of the arm E' ceases to move when the rake reaches that part of the platform adjacent to the cutters, and this movement and cessation is caused by reason of the peculiar construction of the cam W and the arrangement of the lever V, fulcrumed in the groove of the said cam and acting in connection with the bar A', arranged in the manner described. While the lower end of the arm E' is at rest the continued movement of the reel causes the rod G' to push the free end of the beater F' around so that the rake makes a quadrantal sweep, and during this sweep the bent rod B' serves to hold the rake in its proper position with reference to the platform, and assists in bracing the arm E' while the rake is resuming its position in the reel and thereafter. As soon as the rake has made a sufficient sweep the arm $v$ reaches such a part of the cam W that arm E' and its attachments are raised above the platform; and when these parts are thus sufficiently raised the continued movement of the reel causes the arm E' to move to its original position therein, and during this movement of the arm E' the rod G' draws the rake into its original position.

It will be observed that, though we have here designated the bar F' as a "beater," it does not operate as such, but serves as a support for the rake and certain parts of the mechanism which operates in connection with it, and that the rake-head serves as a beater instead of the bar F'.

Having thus described our invention, what we claim as new, and desire to secure by Letters Patent, is—

1. The revolving arm U having the lever V pivoted thereto and fulcrumed in the cam W, constructed substantially as described, the outer end of the lever V being pivoted to the inner or upper end of the arm E', in combination with the arm A' also pivoted to the arms U and E', substantially as described, all for the purpose of bringing the lower end or heel of the arm E' to a state of rest and returning it to its original position during the operation of the reel, substantially as specified.

2. The false beater F' pivoted to the arm E', substantially as described, and carrying the hinged rake H, in combination with the rod G', swivel-jointed to the beater F' and to the reel.

3. The bent rod B' attached to the reel and arranged in the slot D' of the arm E', substantially as and for the purpose specified.

4. The rake H hinged to the false beater F', substantially as described, and having its forward folding movement limited by means of the bent pieces I I attached to the rake-head and engaging the said beater.

5. The hinged rake H, in combination with the slide J provided with lugs $j\ j$ and the pieces I I rigidly attached to the rake-head and engaging the lugs $j\ j$, substantially as and for the purposes specified.

6. In combination, the slide N provided with the arm $n$, the pivoted link O, pivoted rod P, bell-crank Q, pivoted rod R, slotted rod S, and rigid arm T, substantially as and for the purposes specified.

7. In combination, the pivoted lever K, way L, and connecting-arm L, substantially as described, and as a means of operating the slide N.

CYRUS A. WERDEN.

Witnesses:
F. F. WARNER,
N. C. GRIDLEY.